(12) United States Patent
Kagle

(10) Patent No.: US 7,213,202 B1
(45) Date of Patent: May 1, 2007

(54) SIMPLIFIED DESIGN FOR HTML

(75) Inventor: Jonathan Kagle, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 268 days.

(21) Appl. No.: 09/299,724

(22) Filed: Apr. 27, 1999

Related U.S. Application Data

(60) Provisional application No. 60/111,999, filed on Dec. 11, 1998.

(51) Int. Cl.
G06F 15/00 (2006.01)

(52) U.S. Cl. .................................... 715/517; 715/501.1

(58) Field of Classification Search ................ 707/513, 707/501.1; 345/700; 715/501.1, 513, 500, 715/517, 530
See application file for complete search history.

(56) References Cited

U.S. PATENT DOCUMENTS

| | | | | |
|---|---|---|---|---|
| 5,845,299 | A | | 12/1998 | Arora et al. ................ 707/513 |
| 5,864,338 | A | | 1/1999 | Nestor et al. |
| 5,893,127 | A | * | 4/1999 | Tyan et al. ................ 715/513 |
| 5,898,836 | A | * | 4/1999 | Freivald et al. ............ 709/218 |
| 5,937,418 | A | * | 8/1999 | Ferris et al. ............... 707/513 |
| 5,966,535 | A | * | 10/1999 | Benedikt et al. ............. 707/10 |
| 6,021,426 | A | | 2/2000 | Douglis et al. |
| 6,026,433 | A | | 2/2000 | D'Arlach et al. |
| 6,035,323 | A | | 3/2000 | Narayen et al. |
| 6,112,242 | A | * | 8/2000 | Jois et al. .................... 709/225 |
| 6,122,661 | A | * | 9/2000 | Stedman et al. ............ 709/217 |
| 6,141,666 | A | | 10/2000 | Tobin |
| 6,185,587 | B1 | * | 2/2001 | Bernardo et al. ........... 345/712 |
| 6,192,363 | B1 | * | 2/2001 | Yasumura .................... 707/10 |
| 6,195,681 | B1 | * | 2/2001 | Appleman et al. .......... 709/203 |
| 6,199,082 | B1 | * | 3/2001 | Ferrel et al. ................. 715/522 |
| 6,223,190 | B1 | | 4/2001 | Aihara et al. |
| 6,253,228 | B1 | * | 6/2001 | Ferris et al. ................ 707/202 |
| 6,260,192 | B1 | * | 7/2001 | Rosin et al. ................... 725/39 |
| 6,304,886 | B1 | | 10/2001 | Bernardo et al. |

(Continued)

OTHER PUBLICATIONS

Adams et al., Template Style Considerations for Sea-of -Gates Layout Generation, 1969, ACM, pp. 31-36.*

(Continued)

Primary Examiner—Cong-Lac Huynh
(74) Attorney, Agent, or Firm—Banner & Witcoff, Ltd.

(57) ABSTRACT

A method for generating a hypertext markup language (HTML) page in which a style template is selected for a predetermined region of a web page layout. The predetermined region of the web page layout is a horizontal region spanning an entire width of the web page layout. The selected style template can be, for example, a title template, a text template, an audio template, a picture template, a parallel column template or a navigational bar template, and is selected by selecting a graphical icon representing the style of the template. The selected style template includes at least one HTML code defining a style of the style template and can include a space for information that is related to the style of the style template. Information related to the style of the template, such as a title, text, hypertext link information, a pointer to a file containing information that is to be inserted into the selected template, image information, graphical information and/or audio information, is inserted into the space before uploading the finished web page layout to a server. Typically, a plurality of selected style templates are concatenated to generate the finished web page layout. A finished web page layout is then uploaded to the server.

68 Claims, 6 Drawing Sheets

U.S. PATENT DOCUMENTS

| | | | |
|---|---|---|---|
| 6,313,835 B1* | 11/2001 | Gever et al. | 345/846 |
| 6,324,521 B1 | 11/2001 | Shiota et al. | |
| 6,330,575 B1* | 12/2001 | Moore et al. | 715/513 |
| 6,336,210 B1* | 1/2002 | Taima et al. | 717/100 |
| 6,341,290 B1* | 1/2002 | Lombardo et al. | 707/104.1 |
| 6,344,853 B1 | 2/2002 | Knight | |
| 6,397,387 B1* | 5/2002 | Rosin et al. | 345/716 |
| 6,417,931 B2* | 7/2002 | Mori et al. | 358/1.15 |
| 6,429,880 B2* | 8/2002 | Marcos et al. | 345/744 |
| 6,434,578 B1* | 8/2002 | McCauley et al. | 715/517 |
| 6,449,260 B1* | 9/2002 | Sassin et al. | 370/270 |
| 6,466,970 B1* | 10/2002 | Lee et al. | 709/217 |
| 6,522,738 B1* | 2/2003 | Cruickshank et al. | 379/201.03 |
| 6,553,410 B2* | 4/2003 | Kikinis | 709/218 |
| 6,636,648 B2* | 10/2003 | Loui et al. | 382/284 |
| 6,751,778 B1* | 6/2004 | Broman et al. | 715/517 |
| 7,178,101 B2* | 2/2007 | Tunning | 715/513 |
| 2002/0002569 A1* | 1/2002 | Nguyen et al. | 707/515 |
| 2002/0023111 A1* | 2/2002 | Arora et al. | 707/513 |

OTHER PUBLICATIONS

Fernandez et al., Catching the Boat with Strudel: Experiences with a Web-Site Management System, 1998, ACM, pp. 414-425.*

Rosenthal, Adobe SiteMill 1.0: Site Management Made Easy, Internet 1998, pp. 1-2.*

Lemay, Teach Yourself Web Publishing with HTML 3.0 in a Week, Same.net Publishing 1996, pp. 46-47.*

Borning et al., Constraints for the Web, ACM 1997, pp. 173-182.*

Laura Lemay, "Teach Yourself Web Publishing with HTML in 14 days", pp. 381-391, 1995.

Mack et al., "HTML 4.0 No Experience Required", pp. 542-546, 1997.

U.S. Appl. No. 09/300,141, filed Apr. 27, 1999.

* cited by examiner

SIMPLIFIED DESIGN FOR HTML

This application claims priority under 35 USC 119(e) to U.S. Provisional Application 60/111,999, filed Dec. 11, 1998.

TECHNICAL FIELD

The invention relates to systems and methods for generating web pages to be displayed on distributed networks, such as the World Wide Web. More particularly, the invention relates to systems and methods for providing users of a hand-held device, such as a personal digital assistant, a digital camera, or a web television box, with the capability to author web pages without being limited by the system resources of the hand-held device.

BACKGROUND OF THE INVENTION

The distributed network known as the Internet is a global array of cooperatively interconnected computer networks. It includes the World Wide Web, which is a collection of websites defined by web servers—computers that store and retrieve computer files representing web pages that are requested by and displayed to users of the Internet. Web pages combine text, graphic images, animation, audio and other multimedia forms for presentation to viewers. In the Web environment, client machines communicate with Web servers using Hypertext Transfer Protocol (HTTP), which uses a standard page description language known as Hypertext Markup Language (HTML). HTML provides basic document formatting and allows the developer to specify "links" to other servers and files.

It is known to provide web page authoring tools, such as "FRONT PAGE" and "FRONTPAGE EXPRESS" developed by Microsoft Corporation of Redmond, Wash., which provide web page authors an ability to quickly and efficiently create compelling web pages. Much of the power of these tools is derived from the use of style templates, which contain predefined HTML formatting commands for predetermined styles. Because of the need to store large libraries of templates and other large files, such as background bitmaps, state-of-the-art web-authoring tools require computer platforms with relatively large amounts of system resources, i.e., memory. With templates, a web page author avoids the tedious task of manually entering hundreds of HTML formatting commands.

When an HTML page is created, programs such as "FRONTPAGE" and "FRONTPAGE EXPRESS" use a stream-based approach that generates a page layout arranged as a stream of commands and data. A particular style command is selected. Data, such as text, is then entered. The selected style is then closed. Such an approach is extremely flexible by providing many layout styles, but, as mentioned, requires that a client device on which the HTML page is being created to have a significant amount of processing power and memory.

There is a recent growing trend towards the use of portable hand-held computing devices that offer portability, but which provide somewhat limited computing features. Known hand-held devices, such as personal digital assistants (PDAs), provide for the storage and retrieval of addresses and other information, sending and receiving of e-mail via communications link and other functionality defined by resident software applications. PDAs offer the capability of remote connectivity to a desktop computer or to the Internet using a communications link, enabling users to upload and download information, and to synchronize information stored in the PDA with information on a host computer, from virtually any geographic location. Hand-held devices also include rather specialized platforms, such as digital cameras, which provide users with the capability of instantly recording electronic images on a removable storage device, such as a floppy diskette, for later viewing on a desktop computer. From the desktop computer, users may send the image files to their friends via e-mail, post them to an existing website on the World Wide Web, or incorporate them into their own website. As the user interfaces and features of digital cameras become more sophisticated, they may tend to incorporate much of the functionality of PDAs.

One consequence of the compact designs and low weights consumers desire in hand-held electronic devices is that such devices are limited in the amount of system resources, namely memory and screen size, that they provide. Although the portability of hand-held devices make them attractive as web-authoring platforms, they have not heretofore been considered as feasible platforms for web creation, primarily because of their limited system resources. It would therefore be desirable to provide a web-authoring system and method that are suitable for implementation on a hand-held device, such as a PDA or a digital camera. Such a system and method would permit users of digital cameras, for example, to create compelling web pages that incorporate digital images they have recorded "on-the-spot" and provide their own textual information for presentation to others on the World Wide Web. It would also be desirable to provide a way to layout an HTML page that does not require the client device on which the HTML page is being created to have a significant amount of processing power and/or memory.

SUMMARY OF THE INVENTION

The invention provides for the creation of web pages on hand-held devices, such as PDAs, digital cameras and web television boxes. More specifically, the present invention provides a way to layout an HTML page that does not require the client device on which the HTML page is being created to have a significant amount of processing power and/or memory. In that regard, the present invention divides a page into rows, or horizontal regions, that span the entire width of the page. A particular region is laid out by selecting a style template from a library of predetermined style templates depicted by graphical icons representing particular layout styles. Exemplary style templates include templates for titles, text, audio, pictures, parallel column and navigational bars. According to the invention, each template includes HTML codes for the particular style of the template and blank spaces for information, such as text or pictures. The horizontal regions are stacked in any order to create a web page. Macro templates can be defined for a page for repeated use. When the finished page layout is uploaded to a server, the source files for information added to each template is mapped to the templates.

The advantages of the present invention are provided by a method for generating a hypertext markup language (HTML) page in which a style template is selected for a predetermined region of a web page layout. Preferably, the predetermined region of the web page layout is a horizontal region spanning an entire width of the web page layout. The selected style template can be, for example, a title template, a text template, an audio template, a picture template, a parallel column template or a navigational bar template, and is selected by selecting a graphical icon representing the style of the template. According to the invention, the selected style template includes at least one HTML code defining a style of the style template and can include a space for information that is related to the style of the style template. Information related to the style of the template, such as a title, text, hypertext link information, a pointer to a file containing information that is to be inserted into the selected template, image information, graphical information and/or audio information, is inserted into the space before uploading the finished web page layout to a server. Typically, a plurality of selected style templates are concatenated to generate the finished web page layout. A finished web page layout is then uploaded to the server.

BRIEF DESCRIPTION OF THE DRAWINGS

The present invention is illustrated by way of example and not limitation in the accompanying figures in which like reference numerals indicate similar elements and in which.

DETAILED DESCRIPTION OF THE INVENTION

Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Figure 1:
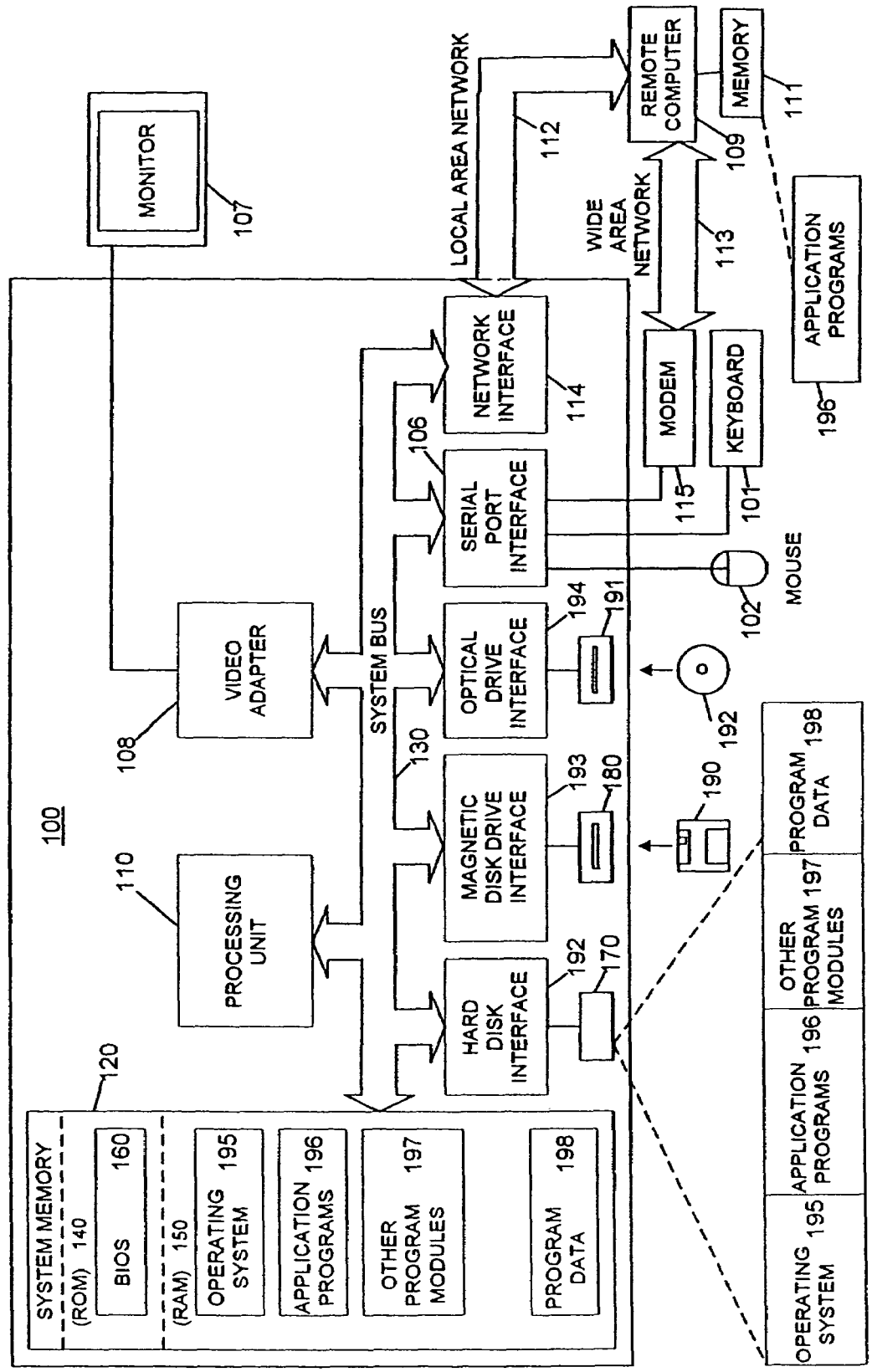
FIG. 1 is a schematic diagram of a conventional general-purpose digital computing environment that can be used to implement various aspects of the present invention.

FIG. 1 is a schematic diagram of a conventional general-purpose digital computing environment that can be used to implement various aspects of the invention. Computer 100 includes a processing unit 110, a system memory 120 and a system bus 130 that couples various system components including the system memory to the processing unit 110. System bus 130 may be any of several types of bus structures including a memory bus or memory controller, a peripheral bus, and a local bus using any of a variety of bus architectures. System memory 120 includes a read only memory (ROM) 140 and a random access memory (RAM) 150.

A basic input/output system (1310S) 160 containing the basic routines that help to transfer information between elements within the computer 100, such as during start-up, is stored in ROM 140. Computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 192, such as a CD ROM or other optical media. Hard disk drive 170, magnetic disk drive 180, and optical disk drive 191 are respectively connected to the system bus 130 by a hard disk drive interface 192, a magnetic disk drive interface 193, and an optical disk drive interface 194. The drives and their associated computer-readable media provide nonvolatile storage of computer readable instructions, data structures, program modules and other data for personal computer 100. It will be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs), and the like, may also be used in the exemplary operating environment.

A number of program modules can be stored on the hard disk, magnetic disk 190, optical disk 192, ROM 140 or RAM 150, including an operating system 195, one or more application programs 196, other program modules 197, and program data 198. A user can enter commands and information into computer 100 through input devices, such as a keyboard 101 and a pointing device 102. Other input devices (not shown) may include a microphone, joystick, game pad, satellite dish, scanner, or the like. These and other input devices are often connected to the processing unit 110 through a serial port interface 106 that is coupled to the system bus, but may be connected by other interfaces, such as a parallel port, a game port or a universal serial bus (USB). A monitor 107 or other type of display device is also connected to system bus 130 via an interface, such as a video adapter 108. In addition to the monitor, personal computers typically include other peripheral output devices (not shown), such as speakers and printers.

Computer 100 can operate in a networked environment using logical connections to one or more remote computers, such as a remote computer 109. Remote computer 109 can be a server, a router, a network PC, a peer device or other common network node, and typically includes many or all of the elements described above relative to computer 100, although only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets and the Internet.

When used in a LAN networking environment, computer 100 is connected to local network 112 through a network interface or adapter 114. When used in a WAN networking environment, personal computer 100 typically includes a modem 115 or other means for establishing a communications over wide area network 113, such as the Internet. Modem 115, which may be internal or external, is connected to system bus 130 via serial port interface 106. In a networked environment, program modules depicted relative to personal computer 100, or portions thereof, may be stored in the remote memory storage device.

It will be appreciated that the network connections shown are exemplary and other means of establishing a communications link between the computers can be used. The existence of any of various well-known protocols, such as TCP/IP, Ethernet, FTP, HTTP and the like, is presumed, and the system can be operated in a client-server configuration to permit a user to retrieve web pages from a web-based server. Any of various conventional web browsers can be used to display and manipulate data on web pages A primary aspect of the invention provides a method and system for generating web pages based on a compact mapping file created and stored on the hand-held device or remote computer 109. Another aspect of the invention relates to a simplified layout for a web page suitable for implementation on a hand-held device. The simplified HTML layout will first be described with reference to FIGS. 2–5 to illustrate one method of creating a template mapping file according to the invention. FIG. 6 shows an exemplary format of a template mapping file generated according to the present invention. It will be recognized that the simplified layout described below is intended to illustrate one possible method and user interface for creating the mapping file. Other methods of creating the mapping file will be apparent to those of ordinary skill upon a reading of this disclosure.

Figure 2:
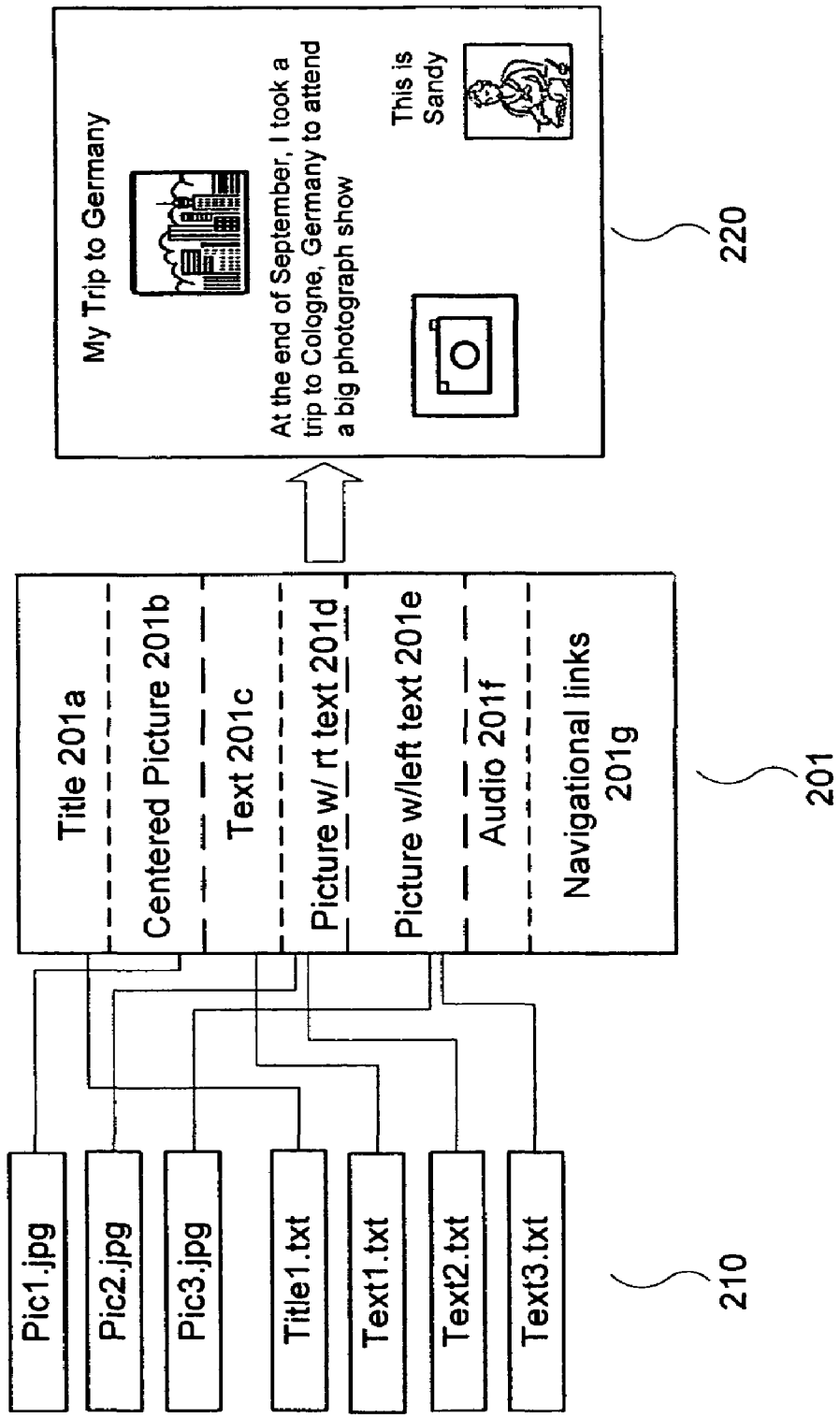
FIG. 2 shows the constituent components forming an exemplary HTML page layout that is generated according to the present invention.

FIG. 2 shows the constituent components forming an exemplary HTML page layout that is generated according to the present invention. Specifically, FIG. 2 shows an exemplary arrangement of style templates 201a–201g corresponding to template files identified as Title, Centered Picture, Picture w/rt text, Picture w/left text, Audio, and Navigational links, as illustrated in FIG. 2, and associated source files 210 that have been selected to generate a final page layout 220. While the present invention is not as flexible as current approaches, the present invention provides a much simpler technique for creating a web page. Consequently, a client device on which an HTML page is created can have limited memory and display area, such as that available with a small consumer electronic device.

According to the present invention, a page layout is divided into rows, or horizontal regions, that span the entire width of the page. A particular region is laid out by a user selecting a style template from a library of predetermined style templates. Exemplary style templates include templates for titles, audio, pictures, parallel column and navigational bars. Each template includes HTML codes for the particular style of the template and blank spaces for information, such as text or picture. The horizontal regions forming a page layout can be stacked in any order to create a customized web page. Macro templates can be defined for a page for repeated use. When the finished page layout is uploaded to a server, the source files for information added to each template is mapped to the templates.

As shown in FIG. 2, a style template can be associated with a source file of information that tailors the style template to the user's liking. For example, a title style template 201a is associated with a Title1.txt file containing text for a title. The association can be the actual file itself or a pointer to a file containing the desired title textual information. Similarly, a centered-picture style template 201b is associated with a Pic1.jpg file containing a picture image or a pointer to a file containing the desired picture information. A text template 201c is associated with a Text1.txt file or a pointer to a file containing textual information to a desired text file.

Style templates can also be associated with more than one information file depending on the specific style of the template. For example, a picture w/right text style template 201d is associated with a Pic2.jpg file (or a file pointer) containing a picture image and a Text2.jpg file (or file pointer) containing textual information. FIG. 2 also shows a picture w/left text style template 201e that is associated with a Pic3.jpg file and a Text2.txt file (or file pointers).

An audio style template 201f can be associated with one or more Audio.wav files (or file pointers) containing audio information. Similarly, a navigational link style template 201f can be associated with one or more files (or pointers) containing link information.

Once a user is satisfied with a page layout, an upload command is selected and the finished page layout is uploaded to a server (remote computer 109 in FIG. 1). The source files associated with each template is mapped to the templates at the server. FIG. 2 shows the resulting page layout 220 for the exemplary arrangement of style templates 201 and associated source files 210.

Figure 3:
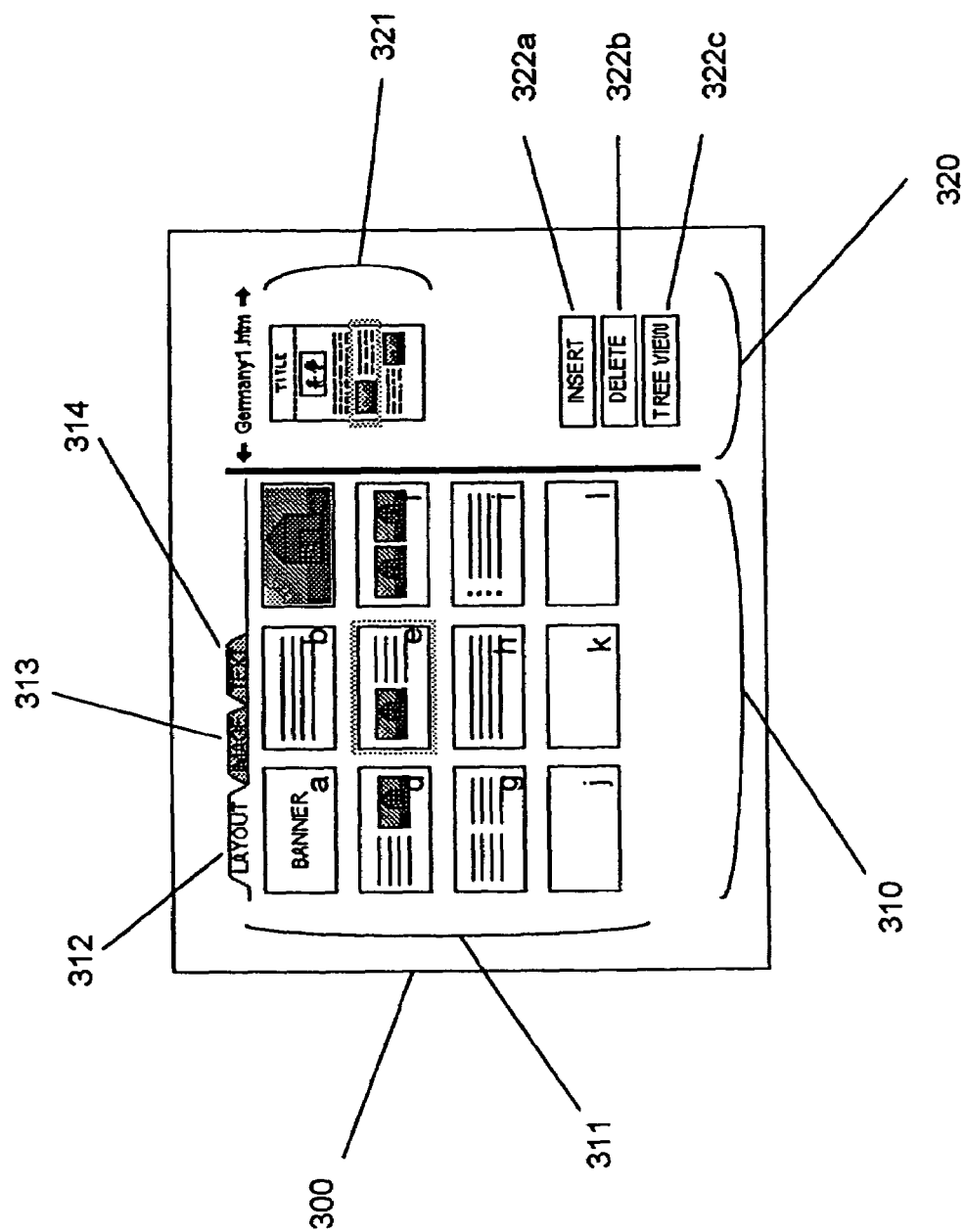
FIG. 3 shows an exemplary graphical user interface (GUI) for selecting style templates for generating an HTML page layout according to the present invention.

FIG. 3 shows an exemplary graphical user interface (GUI) 300 for selecting style templates for generating an HTML page layout according to the present invention. Preferably, GUI 300 is displayed on a small consumer electronic device having limited memory and display area, such as a WINDOWS CE-based digital camera or a WINDOWS CE-based personal digital assistant (PDA). Alternatively, GUI 300 can be displayed on a personal computer (PC) or a workstation, such as computer 100 shown in FIG. 1. Of course, the present invention is applicable to other graphical user interface computing environments.

In FIG. 3, GUI 300 is shown divided into two display regions 310 and 320. Display region 310 includes a library of exemplary style icons 311 that are selectable by a user using a user interface selection device, such as a mouse, a trackball, a joystick or other well-known cursor-control/entry-selection device. As shown in FIG. 3, a library of exemplary style icons 311a–311l are displayed when layout tab 312 is selected.

Each style icon 311 is a recognizable graphical image that represents a particular style template. For example, style icon 311a is a graphical image representing a banner or a title style template. Style icon 311b is a graphical image for text-only style template. Style icon 311c is a graphical image for a single photographic or graphical image style template. Style icons 311d–311f represent combinations of textual and/or image style templates. Style icons 311g–311i represent different exemplary textual style templates. Of course, other recognizable icons can be displayed that represent other style templates that are not described.

Display region 320 includes a graphical image 321 representing a current web page that is being created. As different style templates are selected, web page image 321 changes to reflect the relative position of the selected templates. As shown, image 321 includes a title style template at the top of image 321 with a text-only, a picture w/right text and a picture w/left text style templates in order below the title style template. Display region 320 also includes command buttons 322a–322c, which are used for performing selected operations in a well-known manner.

A particular horizontal region 201 (FIG. 2) is laid out by selecting a horizontal portion of image 321 in a well-known manner using the user interface selection device. A particular style for the selected horizontal portion of image 321 is also selected from style icons 311 in a well-known manner using the user interface selection device. Each template includes HTML codes for the particular style of the template and blank spaces for information, such as text or pictures, depending upon the particular style of the template.

Figure 4:
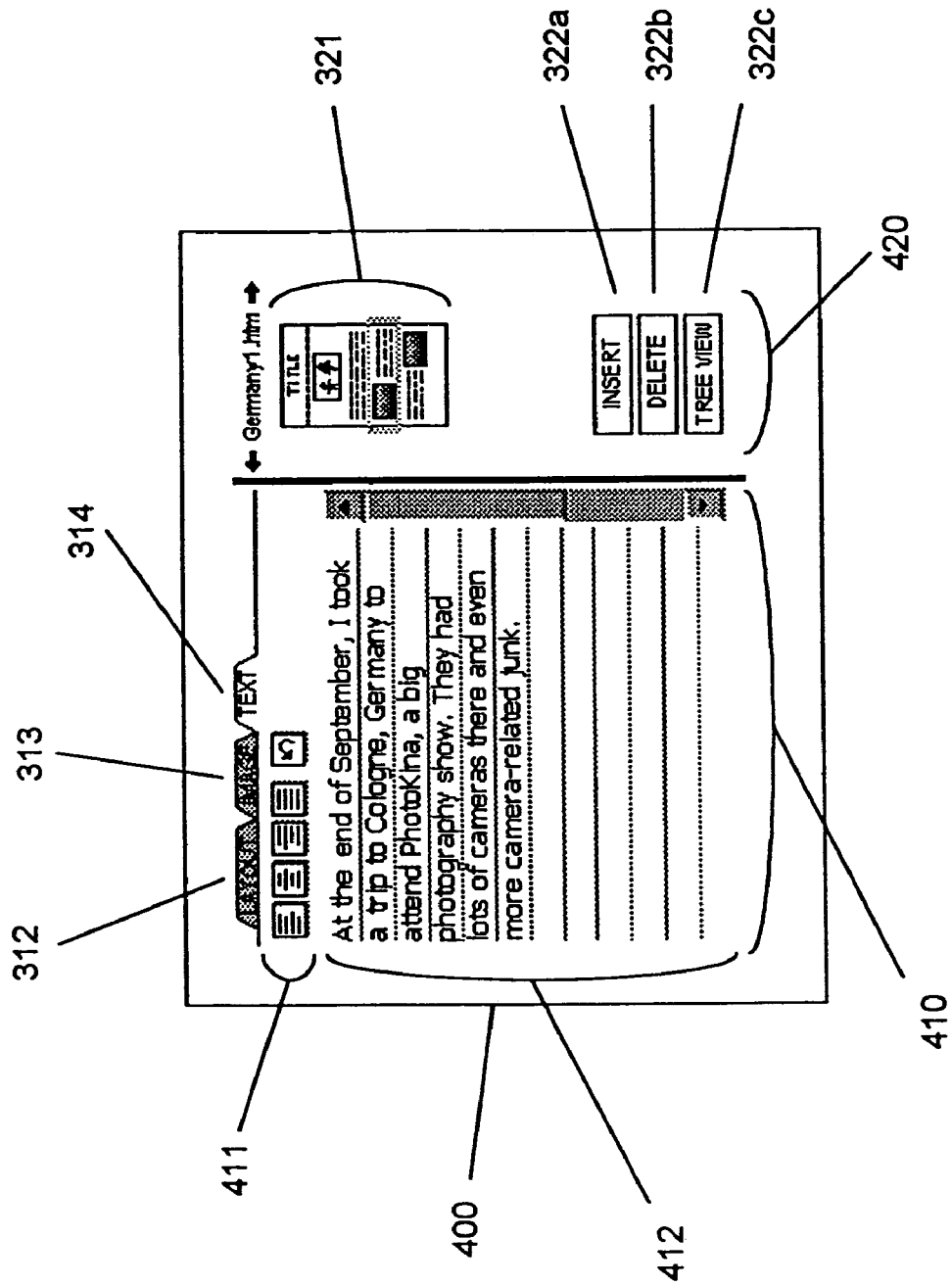
FIG. 4 shows an exemplary GUI 300 for entering textual information into a style template according to the present invention.

When a selected style template includes a blank space for textual information, text tab 314 is selected to display a library of textual formats, attributes and editing functions, such as centering, paragraphing, margins, fonts, sizes, colors, deletion and undo functions, for the text that is entered into the corresponding blank space. FIG. 4 shows an exemplary GUI 400 for entering textual information into a style template according to the present invention. Like GUI 300 of FIG. 3, GUI 400 is preferably displayed on a small consumer electronic device having limited memory and display area. Alternatively, GUI 400 can be displayed on a personal computer (PC) or a workstation.

In FIG. 4, GUI 400 is shown divided into two display regions 410 and 420. Display region 410 includes a library of exemplary formatting and editing icons 411 that are selectable by a user in a well-known manner using the user interface selection device. As shown in FIG. 4, display region 410 includes a text entry field 412 in which textual information for a particular style template is entered. Alternatively, a pointer to a file containing the desired textual information can be entered. Display region 420 is the same as display region 320 of FIG. 3.

When a selected style template includes a blank space for pictorial or graphical information, image tab 313 is selected to display a library of pictorial/graphical formats, attributes and editing functions for the picture or graphical image that is entered into the corresponding blank space. Pictorial/image information can be entered as a pointer to a locally stored image, which is uploaded with the completed page layout, or as a point to a remotely located image that is retrieved and merged with the completed page layout after uploading.

Figure 5:
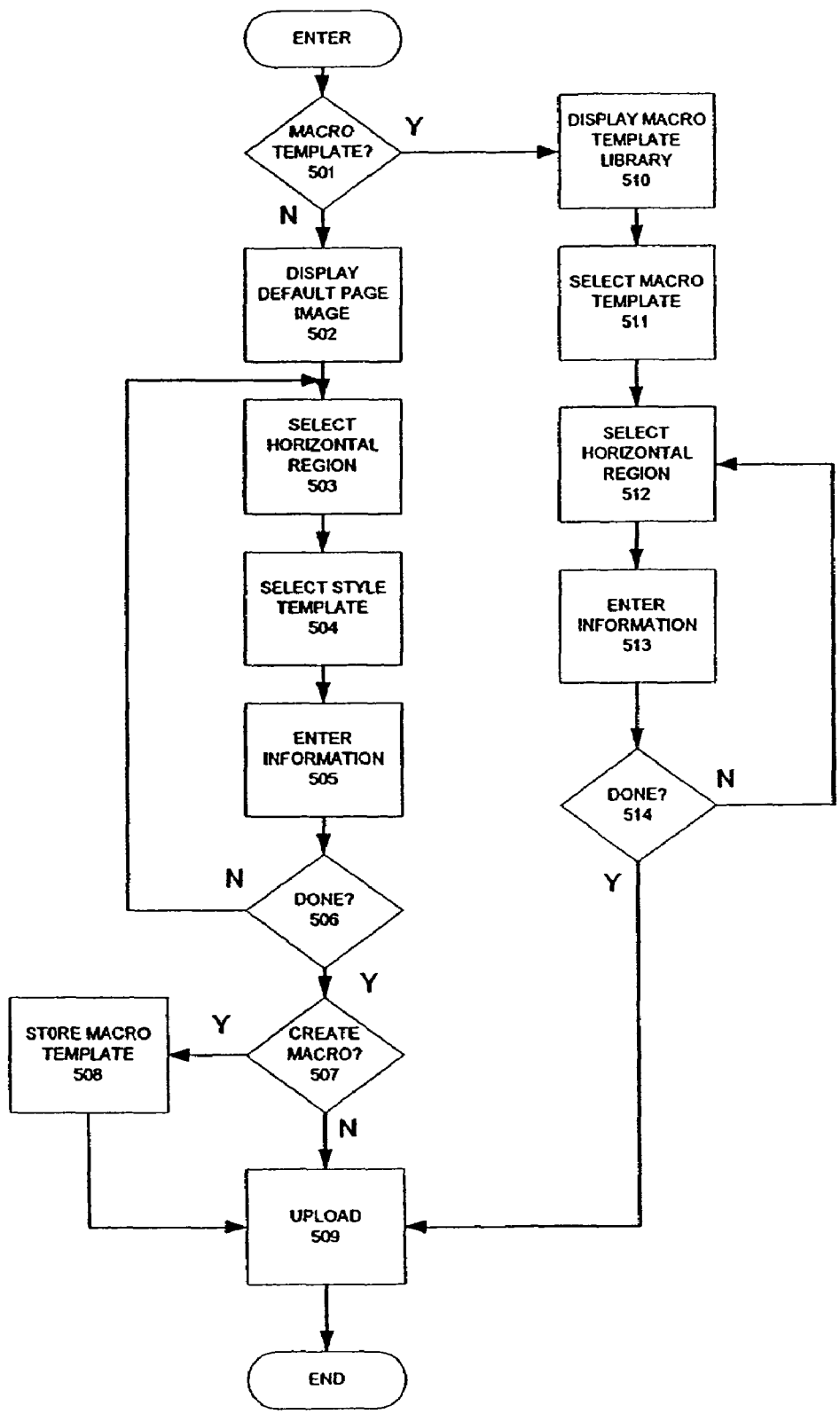
FIG. 5 shows an exemplary flow diagram for generating an HTML page layout according to the present invention.
Figure 6:
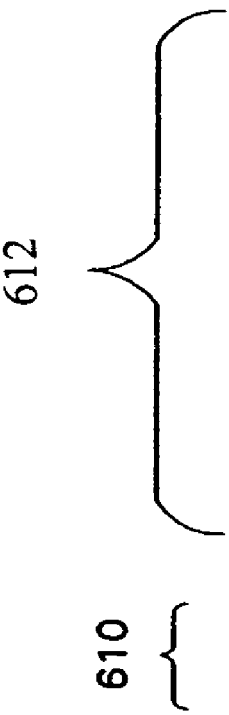
FIG. 6 shows an exemplary format of a template mapping file generated according to the present invention.

FIG. 5 shows an exemplary flow diagram 500 for generating an HTML page layout according to the present invention. At step 501, it is determined whether a user desires to create a web page layout from a previously stored macro style template or create a new page layout. If a new web page layout is desired, flow continues to step 502 where a library of style templates and a default page layout image (i.e., an icon like icon 321, but is only a page outline) are displayed (FIG. 3). Flow continues to step 503 where a particular horizontal region of the displayed page layout is selected using a user interface selection device. Flow continues to step 504 where a particular style template is selected using the user interface selection device. When the selected style template has a space for entering associated information, such as a title, text and/or an image, flow continues to step 505. When no information is to be associated with the selected style template, step 505 is bypassed and flow continues to step 506.

At step 506, it is determined whether the page layout is complete. If so, flow continues to step 507 where it is determined whether a macro style template for the newly-created page layout should be stored for later use. If so, flow continues to step 508 where the newly-created page layout is stored. If not, flow continues to step 509 where the page layout is uploaded to a server.

If at step 501, a macro style template is desired, flow continues to step 510 where a library of previously stored macro style layouts are displayed. At step 511, a particular macro style layout is selected and a page layout image for the selected macro style template is displayed, similar to FIG. 3. Flow continues to step 512 where a particular horizontal region of the displayed macro style template is selected using the user interface selection device. Flow continues to step 513 where any information associated with the selected horizontal region, such as a title, text and/or an image, is entered.

At step 514, it is determined whether the page layout using the selected style template is complete. If so, flow continues to step 509 where the page layout is uploaded to a server.

FIG. 6 illustrates an exemplary format of a template mapping file generated according to the process described above. The template mapping file associates a selected one of a plurality of style templates with one or more source files to be merged into the selected template. This association may be accomplished with the use of delimited pointers, including a style template pointer 610 and one or more source file pointers 612, as shown in FIG. 6, where the delimiter is a comma ",". The first template pointer is designated "6" corresponding to a style selected by the user and associated with a source file, in this case a text file "Title1.txt". Similarly, the second referenced style pointer is designated "12" and is associated with an image file, "Pic1.jpg". Some style sheets may be formatted to be merged with more than one source file, as is the case with the style sheet designated "5" which may be, for example, a style sheet for a right justified image with adjacent text, and is to be merged with two source files: "Text2.txt" and "Pic2.jpg". Those of ordinary skill will recognize that the template mapping file according to the present invention requires only minimal storage because of its compact size and therefore its creation and storage are suitable for implementation on a device with limited memory, such as a hand-held device.

While the present invention has been described in connection with the illustrated embodiments, it will be appreciated and understood that modifications may be made without departing from the true spirit and scope of the invention.

What is claimed is:

1. A method for generating a hypertext markup language (HTML) page, the method comprising steps of:
   generating a web page layout;
   receiving a predetermined selection signal indicative of a user interface selection device pointing at a selected predetermined region of the web page layout;
   receiving a style template selection signal indicative of the user selection device pointing at a selected style template for the predetermined region, the selected style template including at least one HTML code defining a style of the style template; and
   automatically displaying an updated web page layout responsive to receiving the style template selection signal.

2. The method according to claim 1, wherein the predetermined region of the web page layout is a horizontal region spanning an entire width of the web page layout.

3. The method according to claim 1, further comprising a step of uploading the updated web page layout to a server, the updated web page layout including at least one selected style template.

4. The method according to claim 3, wherein the selected style template includes a space for information that is related to the style of the style template,
   the method further comprising a step of inserting the information related to the style of the template into the space before the step of uploading the updated web page layout.

5. The method according to claim 4, wherein the information related to the style of the template is a title.

6. The method according to claim 4, wherein the information related to the style of the template is textual.

7. The method according to claim 4, wherein the information related to the style of the template includes hypertext link information.

8. The method according to claim 4, wherein the information related to the style of the template includes at least two of image information, graphical information, textual information, and audio information.

9. The method according to claim 4, wherein the information related to the style of the style template is a pointer to a file containing information that is to be inserted into the selected template.

10. The method according to claim 9, wherein the file contains image information.

11. The method according to claim 9, wherein the file contains graphical information.

12. The method according to claim 9, wherein the file contains audio information.

13. The method according to claim 1, wherein the selected style template is one of a title template, a text template, an audio template, a picture template, a parallel column template and a navigational bar template.

14. The method according to claim 1, wherein the step of receiving the style template selection signal includes a step of selecting a graphical icon representing the style of the template.

15. The method according to claim 1, further comprising a step of concatenating a plurality of selected style templates to automatically display the updated web page layout.

16. The method according to claim 1, further comprising a step of recording the updated web page layout as a macro style template.

17. The method according to claim 16, further comprising steps of:
 selecting the macro style template;
 inserting information related to the style of each style template forming the macro style template; and
 uploading the updated web page layout to a server.

18. The method according to claim 1, further comprising steps of:
 selecting a second predetermined region of the web page layout; and
 selecting a style template for the second predetermined region.

19. The method according to claim 1, further comprising a step of updating the web page layout responsive to receiving the style template selection signal.

20. The method according to claim 1, further comprising steps of:
 receiving a second predetermined selection signal indicative of the user interface device pointing at a second selected predetermined region of the updated web page layout;
 receiving a second style template selection signal indicative of the user selection input device pointing at a second selected style template for the second predetermined region, the second selected style template including at least one HTML code defining a style of the second style template; and
 automatically displaying a newly-updated web page responsive to receiving the second style template selection signal.

21. The method according to claim 20, wherein the first and second predetermined regions are the same region.

22. The method according to claim 20, wherein the first and second selected style templates are different style templates.

23. A method for generating a hypertext markup language (HTML) page, the method comprising steps of:
 generating a web page layout;
 receiving a predetermined selection signal indicative of a user interface selection device pointing at a selected predetermined region of the web page layout;
 receiving a macro style template selection signal indicative of the user selection device pointing at a selected macro style template for the web page layout, the selected macro style template including at least one style template for the predetermined region, each style template including at least one HTML code defining a style of the style template; and
 automatically display an updated web page layout responsive to receiving the macro style template selection signal.

24. The method according to claim 23, wherein at least one style template of the macro style template includes a space for information related to the style of the style template,
 the method further comprising a step of inserting the information related to the style of the template into the space before the step of automatically generating the updated web page layout.

25. The method according to claim 24, wherein the information related to the style of the template is one of a title, text, a pointer to a file containing image information, a pointer to a file containing graphical information, a pointer to a file containing audio information, and hypertext link information.

26. The method according to claim 23, wherein the macro style template includes a style template that is one of a title template, a text template, an audio template, a picture template, a parallel column template and a navigational bar template.

27. The method according to claim 23, wherein the step of receiving the macro style template selection signal includes a step of selecting a graphical icon representing the selected macro style template.

28. The method according to claim 23, further comprising a step of uploading the updated web page layout to a server.

29. The method according to claim 28, wherein the predetermined region of the web page layout is a horizontal region spanning an entire width of the web page layout.

30. A computer-readable medium having computer-executable instructions for performing steps comprising:
 generating a web page layout;
 receiving a predetermined selection signal indicative of a user interface selection device pointing at a selected predetermined region of the web page layout;
 receiving a style template selection signal indicative of the user selection device pointing at a selected style template for the predetermined region, the selected style template including at least one HTML code defining a style of the style template; and
 automatically displaying an updated web page layout responsive to receiving the style template selection signal.

31. The computer-readable medium according to claim 30, wherein the predetermined region of the web page layout is a horizontal region spanning an entire width of the web page layout.

32. The computer-readable medium according to claim 30, wherein the selected style template includes a space for information that is related to the style of the style template, the computer-executable instructions further performing a step of inserting the information related to the style of the template into the space before the step of automatically displaying the updated web page layout.

33. The computer-readable medium according to claim 32, wherein the information related to the style of the template is a title.

34. The computer-readable medium according to claim 32, wherein the information related to the style of the template is textual.

35. The computer-readable medium according to claim 32, wherein the information related to the style of the template includes hypertext link information.

36. The computer-readable medium according to claim 32, wherein the information related to the style of the template includes at least two of image information, graphical information, textual information, and audio information.

37. The computer-readable medium according to claim 32, wherein the information related to the style of the style template is a pointer to a file containing information that is to be inserted into the selected template.

38. The computer-readable medium according to claim 37, wherein the file contains image information.

39. The computer-readable medium according to claim 37, wherein the file contains graphical information.

40. The computer-readable medium according to claim 37, wherein the file contains audio information.

41. The computer-readable medium according to claim 30, wherein the selected style template is one of a title template, a text template, an audio template, a picture template, a parallel column template and a navigational bar template.

42. The computer-readable medium according to claim 30, wherein the step of receiving the style template selection signal includes a step of selecting a graphical icon representing the style of the template.

43. The computer-readable medium according to claim 30, wherein the computer-executable instructions further perform a step of concatenating a plurality of selected style templates to automatically display the updated web page layout.

44. The computer-readable medium according to claim 30, wherein the computer-executable instructions further perform a step of recording the updated web page layout as a macro style template.

45. The computer-readable medium according to claim 44, wherein the computer-executable instructions further performing steps of:
  selecting the macro style template;
  inserting information related to the style of each style template forming the macro style template; and
  uploading the updated web page layout to a server.

46. A computer-readable medium having computer-executable instructions for performing steps comprising:
  generating a web page layout;
  receiving a predetermined selection signal indicative of a user interface selection device pointing at a selected predetermined region of the web page layout;
  receiving a macro style template selection signal indicative of the user selection device pointing at a selected macro style template for a web page layout, the selected macro style template including at least one style template for the predetermined region, each style template including at least one HTML code defining a style of the style template; and
  automatically displaying an updated web page layout responsive to receiving the macro style template selection signal.

47. The computer-readable medium according to claim 46, wherein the predetermined region of the web page layout is a horizontal region spanning an entire width of the web page layout.

48. The computer-readable medium according to claim 46, wherein at least one style template of the selected macro style template includes a space for information related to the style of the style template,
  the computer-executable instructions further performing a step of inserting the information related to the style of the template into the space before the step of automatically displaying the updated web page layout.

49. The computer-readable medium according to claim 48, wherein the information related to the style of the template is one of a title, text, a pointer to a file containing image information, a pointer to a file containing graphical information, a pointer to a file containing audio information, and hypertext link information.

50. The computer-readable medium according to claim 46, wherein the at least one style template is one of a title template, a text template, an audio template, a picture template, a parallel column template and a navigational bar template.

51. The computer-readable medium according to claim 46, wherein the step of receiving the macro style template selection signal includes a step of selecting a graphical icon representing the selected macro style template.

52. In a computer system having a graphical user interface including a display and a user interface selection device, a method for providing and selecting items for generating a hypertext markup language (HTML) page, the method comprising steps of:
  displaying a web page layout on a display;
  displaying a plurality of style templates on the display, each style template representing a layout style for a predetermined region of the web page layout;
  receiving a predetermined region selection signal indicative of a user interface selection device pointing at a selected predetermined region on the display;
  receiving a style template selection signal indicative of the user interface selection device pointing at a selected style template on the display, the selected style template associated with at least one HTML code defining a style of the style template; and
  automatically displaying an updated web page layout in response to the received style template selection signal.

53. The method according to claim 52, further comprising the steps of:
  displaying an uploading layout command selection on the display;
  receiving an uploading layout entry selection signal indicative of the user interface device pointing at the uploading layout entry command selection; and
  uploading the updated web page layout to a server in response to the uploading layout entry selection signal, the updated web page layout including at least one selected style template.

54. The method according to claim 52, wherein the predetermined region of the web page layout is a horizontal region spanning an entire width of the web page layout.

55. The method according to claim 52, wherein the selected style template includes a space for information that is related to the style of the style template, the method further comprising a step of receiving the information related to the style of the template for entry into the space.

56. The method according to claim 55, wherein the information related to the style of the template is a title.

57. The method according to claim 55, wherein the information related to the style of the template is textual.

58. The method according to claim 55, wherein the information related to the style of the template includes hypertext link information.

59. The method according to claim 55, wherein the information related to the style of the template includes at least two of image information, graphical information, textual information, and audio information.

60. The method according to claim 55, wherein the information related to the style of the style template is a pointer to a file containing information that is entered into the selected template.

61. The method according to claim 60, wherein the file contains image information.

62. The method according to claim 60, wherein the file contains graphical information.

63. The method according to claim 60, wherein the file contains audio information.

64. The method according to claim 52, wherein the selected style template is one of a title template, a text template, an audio template, a picture template, a parallel column template and a navigational bar template.

65. The method according to claim 52, wherein each style template displayed on the display is a graphical icon representing the style of the template.

66. The method according to claim 52, further comprising a step of concatenating a plurality of selected style templates in response to the received style template selection signal.

67. The method according to claim 52, further comprising steps of displaying at least one macro style template on the display, each macro style template representing a stored web page layout;

receiving a macro style template selection signal indicative of the user interface selection device pointing at a selected macro style template on the display; and displaying the stored web page layout in response to the received style template selection signal.

68. The method according to claim 67, wherein the selected macro style template includes a style template having a space for information that is related to the style of the style template, the method further comprising a step of receiving the information related to the style of the template for entry into the space.

* * * * *